Feb. 3, 1942.  J. W. CHILDRESS  2,272,110
HYDRAULIC VALVE
Filed July 17, 1940  3 Sheets-Sheet 1
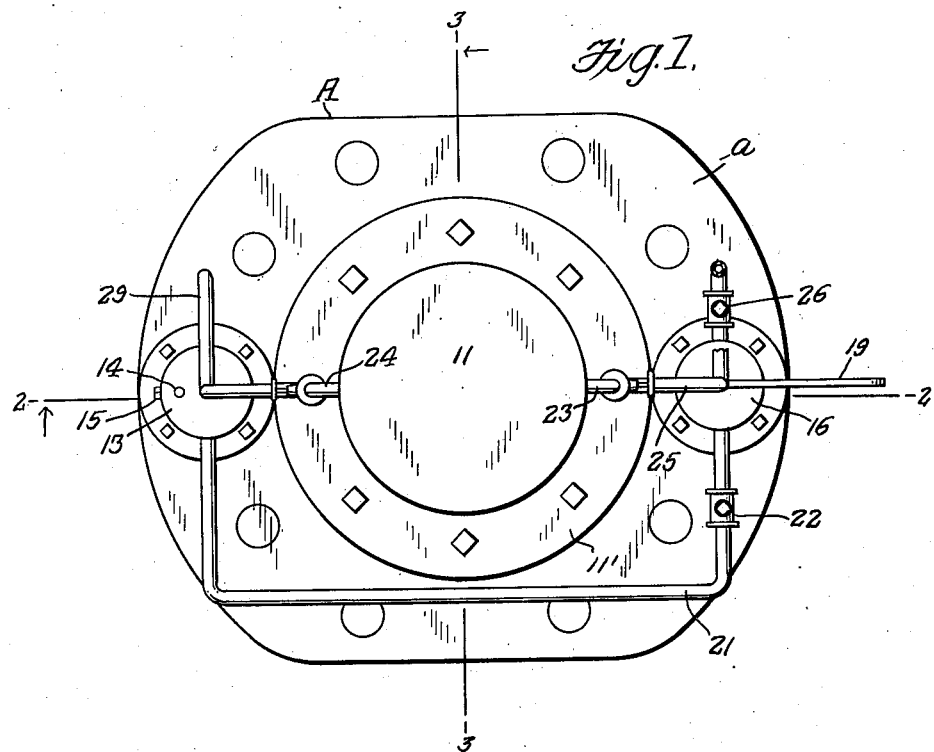
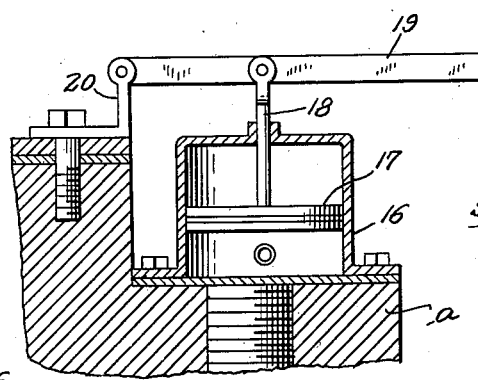
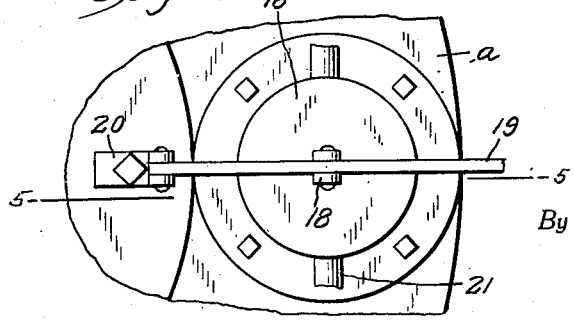
Inventor
James W. Childress
By *Clarence A. O'Brien*
Attorneys Feb. 3, 1942.　　J. W. CHILDRESS　　2,272,110
HYDRAULIC VALVE
Filed July 17, 1940　　3 Sheets-Sheet 3
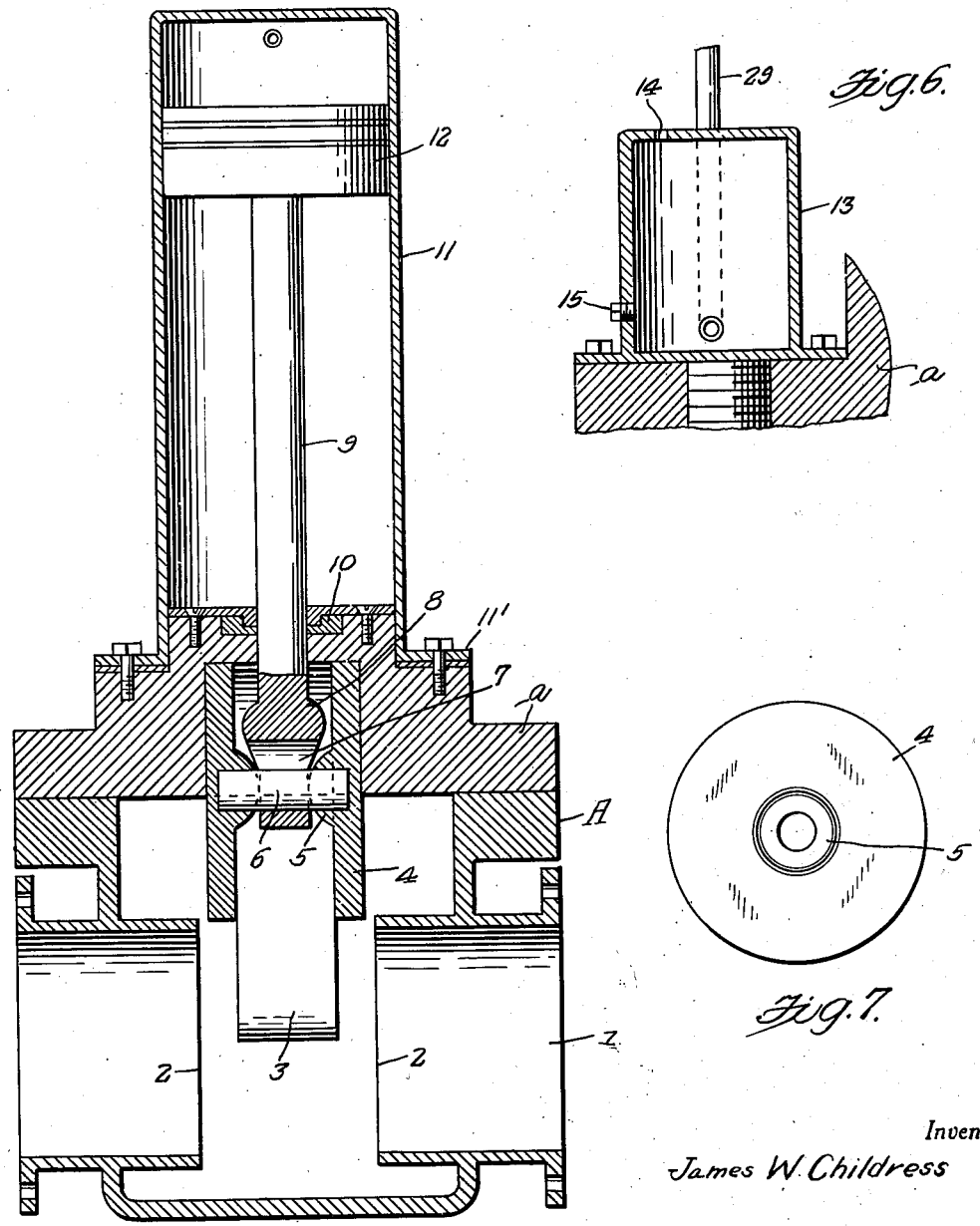
Inventor
James W. Childress
By Clarence A. O'Brien
Attorneys Patented Feb. 3, 1942

2,272,110

UNITED STATES PATENT OFFICE 2,272,110

HYDRAULIC VALVE

James W. Childress, Columbia, Tenn.

Application July 17, 1940, Serial No. 346,050

1 Claim. (Cl. 60—52)

This invention relates to a hydraulic valve, the general object of the invention being to provide a shank or stem having a perforated head with valve forming members connected together by a pin which passes through the hole in the head with the parts so constructed and arranged that the two valve members will be pressed outwardly upon the seat when the stem or shank is moved to valve closing position.

Another object of the invention is to provide a cylinder having a piston therein connected with the shank or stem and a supply of liquid with pump means piped to the supply and with the cylinder and valves in the pipes whereby fluid can be pumped in either end of the cylinder to raise or lower the valve.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a top plan view of the invention.

Figure 3 is a section on the line 3—3 of Figure 1.

Figure 4 is a top plan view of the pump means.

Figure 5 is a section on the line 5—5 of Figure 4.

Figure 6 is a vertical sectional view through the tank.

Figure 7 is a view looking toward the inner face of one of the valve disks.

Figure 2:
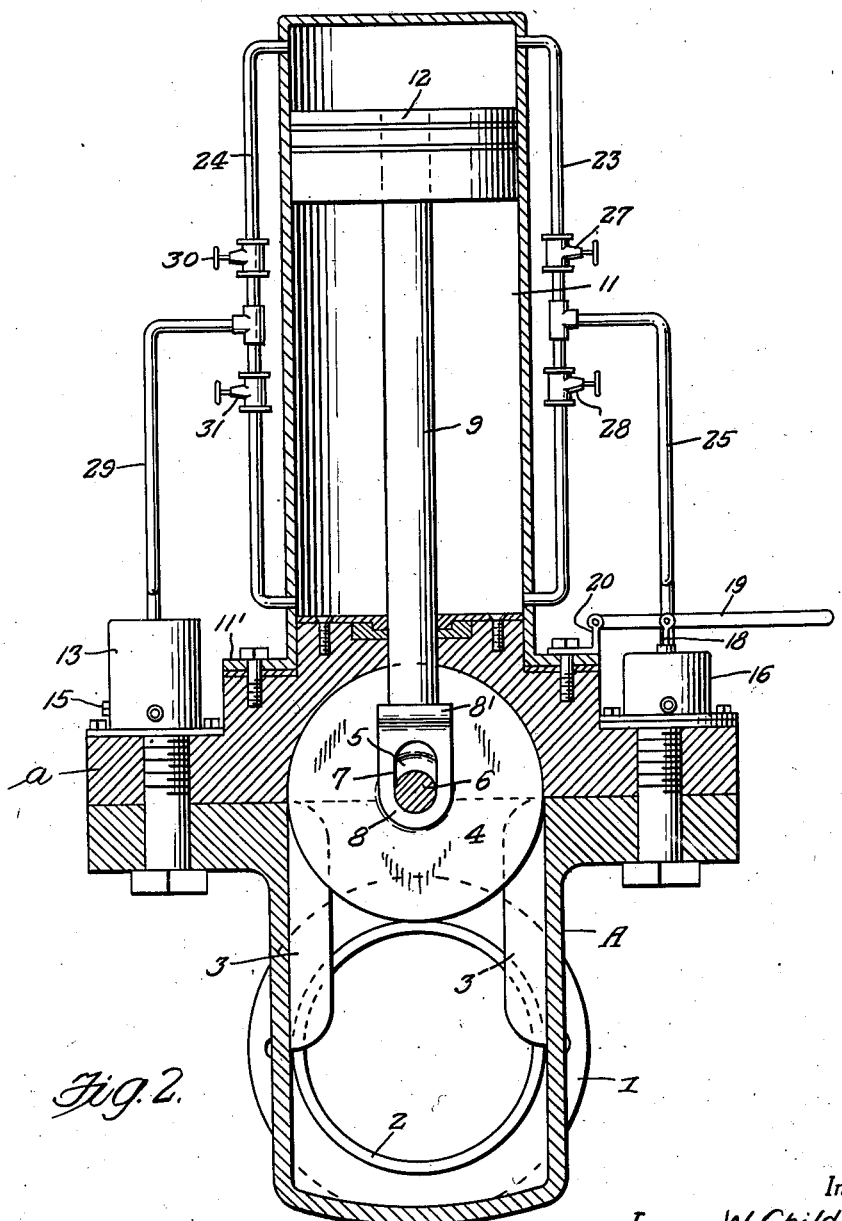
Figure 2 is a section on the line 2—2 of Figure 1.

In these views the letter A indicates the casing or housing of the valve means which is formed with the tubular parts 1 for connection to the conduit to be controlled by the valve means and such parts are spaced at the inner ends and said inner ends form valve seats 2. A pair of vertically arranged guides 3 are located in the casing or housing and the gate or valve member is composed of the two plates 4 each of which has a substantially semi-circular boss 5 on its inner face which is of tubular construction to receive an end of a pin 6 which connects the two plates together in spaced relation and this pin passes through a hole 7 made in the form of a slot and formed in the head 8 of a stem or shank 9. The head has its top part enlarged as shown at 8' with its opposite faces tapering downwardly and the opening 7 passes through these faces. The plates 4 engage opposite side edges of the guides 3 so that the guides hold the two plates 4 apart and when the shank or stem 9 is lowered it will move the plates 4 downwardly through means of the pin 6 until the plates strike the bottom of the housing and then further downward movement of the stem or shank 9 will cause the enlarged part 8' of the head to engage the bosses of the plates which forces the plates apart and presses the plates firmly upon the seats 2 so that leakage is prevented through the parts 1. When in raised position the plates 4 with the head of the stem are located in an opening in the closure part $a$ of the housing with the shank passing through the upper end of the closure part and through packing means 10.

A cylinder 11 is fastened to the closure part $a$ of the housing by its flanged lower end 11' being bolted to the closure part and a piston 12 is connected with the upper end of the stem and is located in the cylinder. A tank 13 containing fluid or liquid is supported on the cover part $a$ and has a vent opening 14 at its top and a drain plug 15 is threaded in a drain opening adjacent the lower end of the tank. A pump cylinder 16 is also supported by the cover part $a$ and contains a piston 17, the stem 18 of which is connected to a lever 19 pivoted to a bracket 20 fastened to a part of the cover $a$. A pipe 21 connects the tank with the pump cylinder and contains a check valve 22 opening toward the pump cylinder. U-shaped pipes 23 and 24 connect the upper end of the cylinder 11 with the lower end thereof and a pipe 25 connects the central part of the pipe 23 with the pump cylinder and contains a check valve 26 and valves 27 and 28 are located in the pipe 23 with the pipe 25 joining the pipe 23 between these valves. A pipe 29 connects the central part of the pipe 24 with the tank 13 and valves 30 and 31 are located in the pipe 24 above and below the junction of the pipe 29 with the pipe 24.

Thus supposing the valve is open and the piston is in raised position it is desired to lower the valve and piston. Valves 28 and 30 are closed and valves 27 and 31 open. Then when the pump is actuated fluid or liquid will be drawn from the tank 13 through the pipe 21 into the pump and this liquid or fluid will be forced from the pump through the pipe 25 and through the upper part of the pipe 23 into the top part of the cylinder 11 which will force the piston downwardly to close the valve and the fluid forced from the lower part of the cylinder 11 by the descending piston will flow through the lower part of the pipe 24 by the valve 31 through the pipe 29 into tank 13. Then when it is desired to raise the piston and the valve, valves 28 and 30 are open and valves 27 and 31 are closed so that when the pump is operated it will draw fluid from the tank through the pipe 21 and this fluid will be forced through the pipe 25 and through the lower part of the pipe 23 by the valve 28 into the lower part of the cylinder 11 so that the piston will be raised and the upward movement of the piston will force the fluid from the top of the cylinder 11 through the pipe 24 by the valve 30 and through the pipe 29 back to the tank.

By this arrangement one operator can open and close the valves and this with but little effort and when closed the valve will provide a perfectly fluid tight closure so that no fluid can pass through the valve housing.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a device of the class described, a supporting member having a centrally arranged circular part on its top, an annular seat forming part surrounding the circular part and arranged in a lower plane than the top of the circular part and a wide part surrounding the seat forming part and arranged in a lower plane than the seat forming part, a cylinder having its lower end open with the circular part fitting in said lower end, an outwardly extending flange at the lower end of the cylinder fastened to the seat forming part, a piston in the cylinder, a rod connected with the piston and passing through one end of the cylinder, a pair of vertically arranged pipes paralleling the cylinder and having their ends bent and connected with upper and lower portions of the cylinder, a pair of valves in each pipe and spaced apart, a third pipe connected with one of the other pipes between the valves in said pipe, a fourth pipe connected with the other one of said pair of pipes between the valves of such pipe, a fluid tank supported on a portion of the wide part of the supporting member and to which the fourth pipe leads, a pump supported on another portion of the wide part of the supporting member and to the outlet of which the third pipe is connected, a conduit connecting the inlet of the pump with the tank and containing a check valve opening toward the pump, a hand lever for actuating the pump piston, and a bracket to which the hand lever is pivoted connected with the flange of the cylinder.

JAMES W. CHILDRESS.